United States Patent [19]

Ohlson

[11] 4,361,314
[45] Nov. 30, 1982

[54] DEVICE FOR ATTACHING A SECOND COMPONENT TO A FIRST COMPONENT IN A SECURE BUT DETACHABLE MANNER

[76] Inventor: Kurt L. Ohlson, Vendelsö skolväg 104, 136 71 Handen, Sweden

[21] Appl. No.: 190,571

[22] Filed: Sep. 25, 1980

[30] Foreign Application Priority Data

Sep. 25, 1979 [SE] Sweden .............................. 7907909

[51] Int. Cl.³ .......................................... E04H 17/14
[52] U.S. Cl. ..................................... 256/65; 403/230; 403/321; 403/401; 256/66
[58] Field of Search ............... 403/171, 172, 174, 176, 403/177, 189, 191, 263, 264, 234, 237, 236, 321; 256/65, 66, 67

[56] References Cited

U.S. PATENT DOCUMENTS

| | | | |
|---|---|---|---|
| 3,195,937 | 7/1965 | Case | 256/67 X |
| 3,580,620 | 5/1971 | Offenbroich | 403/264 X |
| 4,036,371 | 7/1977 | Michel | 403/171 X |
| 4,240,764 | 12/1980 | Wegner | 403/189 X |

FOREIGN PATENT DOCUMENTS 572556 2/1976 Switzerland .......................... 256/67

Primary Examiner—Wayne L. Shedd
Attorney, Agent, or Firm—Burns, Doane, Swecker & Mathis

[57] ABSTRACT

A device for attaching a second component (handrail) to a first component (upright) in a secure but detachable manner. The second component has a clip in the form of an angle. The first component has a recess large enough to accept the clip. The first component works in conjunction with a locking device so designed that in one position it will accept the clip but that in a different position it will permit the locking of the clip.

5 Claims, 11 Drawing Figures

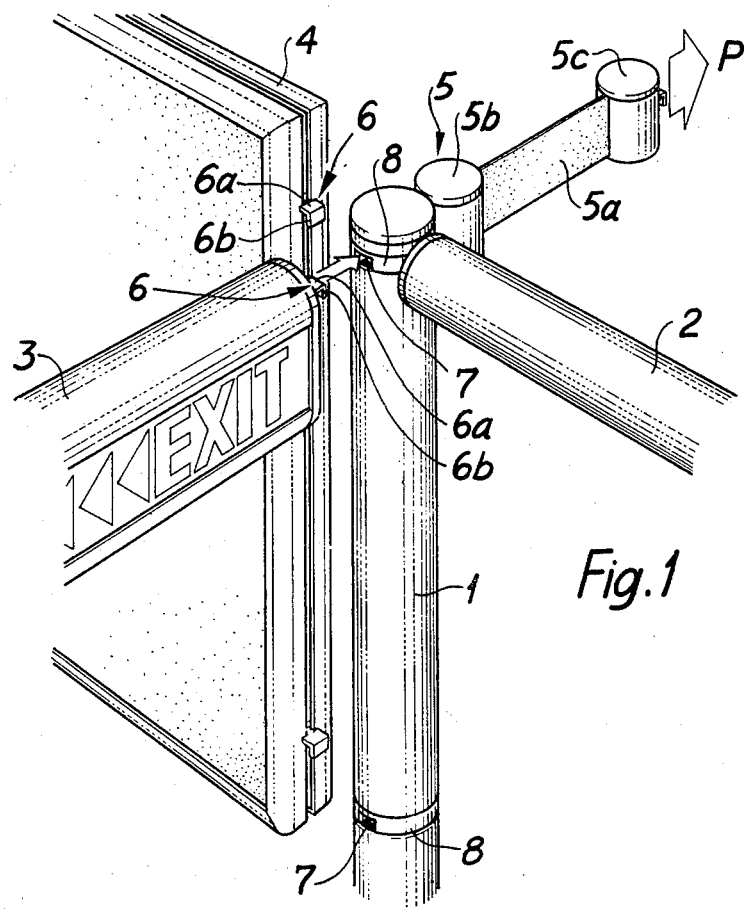
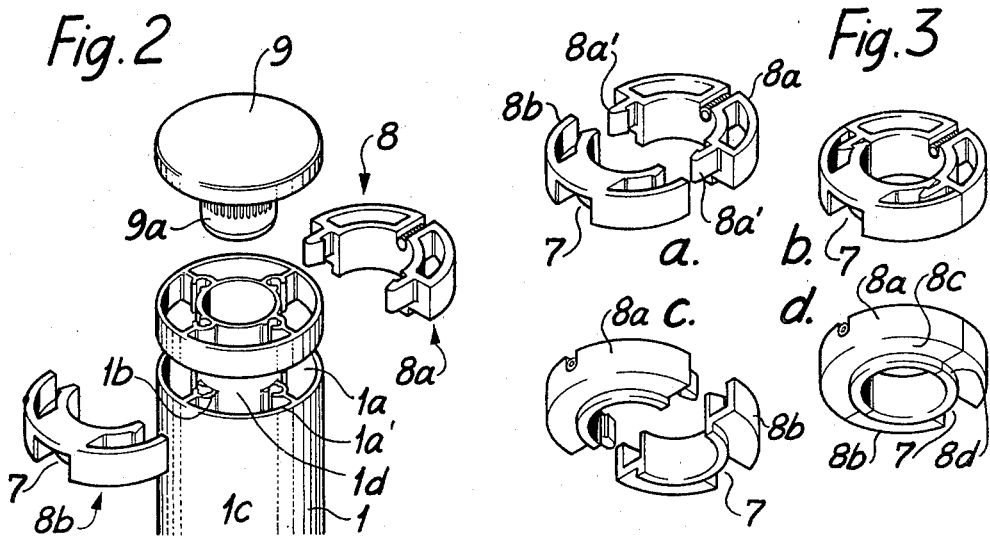

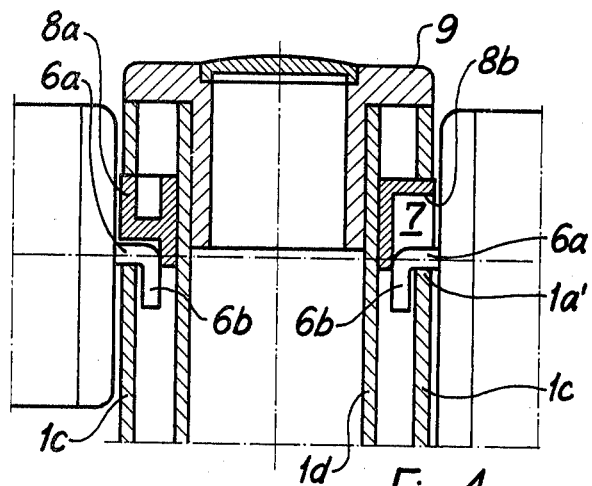
Fig. 4
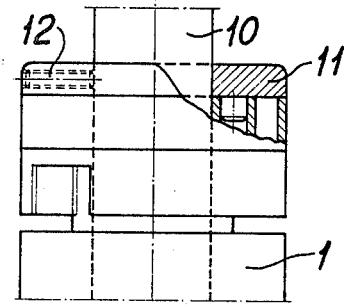
Fig. 5
Fig. 6
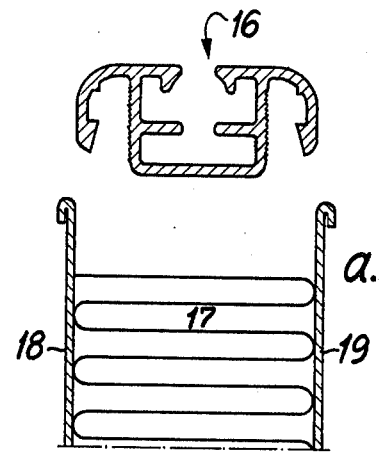
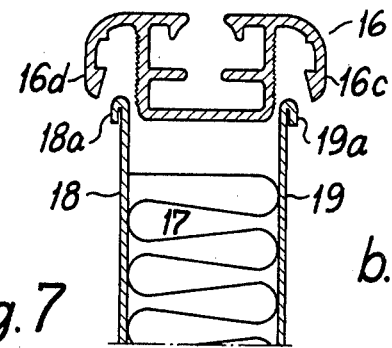
Fig. 7
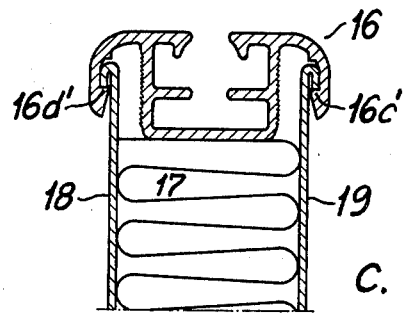

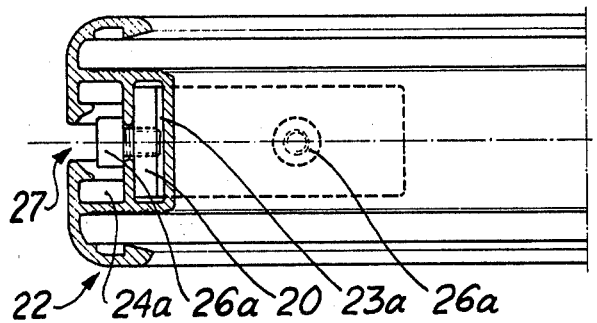
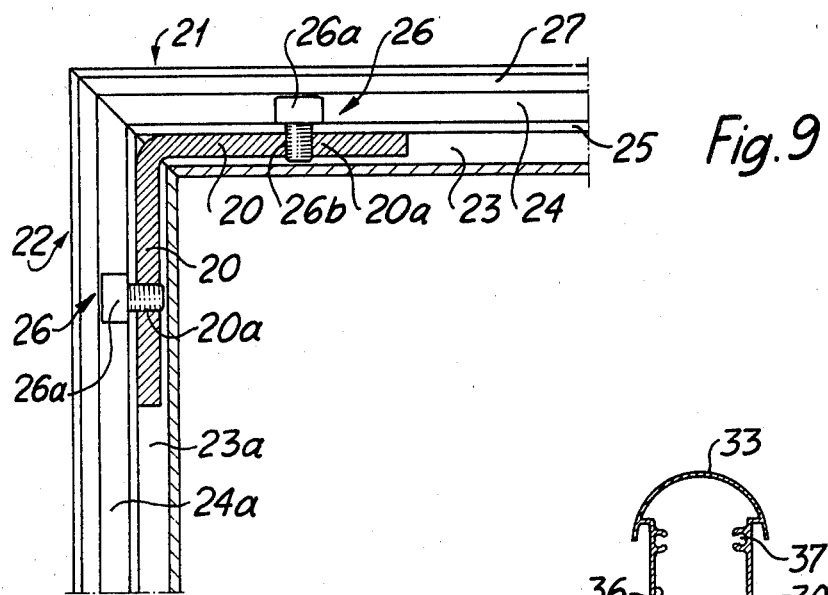
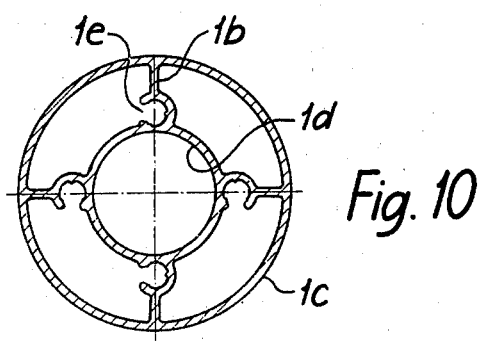
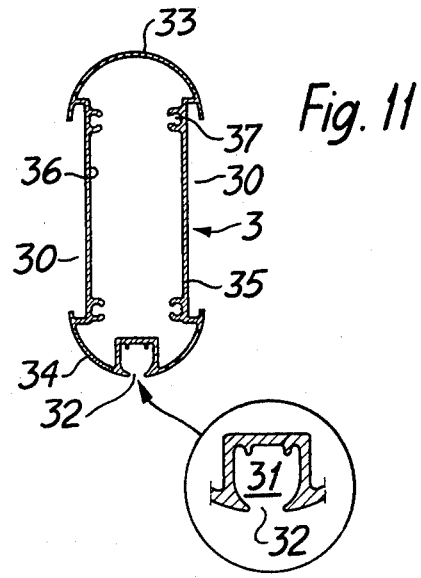
Fig. 8
Fig. 9
Fig. 10
Fig. 11

DEVICE FOR ATTACHING A SECOND COMPONENT TO A FIRST COMPONENT IN A SECURE BUT DETACHABLE MANNER

TECHNICAL FIELD

The present invention relates in particular to a device for attaching a second component to a first component in a secure but simple manner, yet which will allow the components to be dismantled. One application to which the present invention is particularly suited is where the first component is in the form of an upright and where the second component is in the form of a handrail, direction sign, screen, etc., which may be attached to the handrail.

DESCRIPTION OF THE PRIOR ART

We are already familiar with a number of different devices by means of which a second component may be attached to a first component in a secure yet detachable manner. Reference may be made to the type of fastener designed to be attached to the head of a screw as an example of the state of the prior art. These fasteners incorporate a hole, slightly greater than the diameter of the screw head, and a slot extending from the hole, having a width which is less than the diameter of the screw head but which is rather greater than the diameter of the screw.

It has been common practice in open-plan offices to make provision for screens to be attached to uprights, thereby enabling the layout of such open-plan offices to be altered in a simple manner depending on temporary or more permanent requirements.

It has also been common practice in Post Offices and in banks to make use of various direction signs and handrails and to attach these to uprights, thereby enabling the individuals who are to be served to be given directions and guidance.

Similar wishes also exist within other areas of application.

DESCRIPTION OF THE PRESENT INVENTION

Technical Problem

However, in the case of all the applications referred to above a strong desire has emerged for a very flexible system to be available, in which for example one and the same upright is capable of supporting a number of different devices, such as handrails, direction signs and screen walls, etc.

A pronounced desire has also emerged for the length of the upright to be capable of being varied in a simple manner simply by being able to assemble the upright from a number of component parts.

Solution

The aim of the present invention is to specify a device enabling a second component, for instance a handrail, to be attached to a first component, for instance an upright, in a secure yet detachable manner.

In the present invention, the second component has a clip in the form of an angle whereas the first component has a recess large enough to accept the clip. However, the first component must work in conjunction with a locking device which is so designed that in one position it will accept the clip in the form of an angle but that in a different position it will permit the locking of the clip.

It is suggested that the actual locking device should be so arranged as to rotate in relation to the first component, and it is also suggested at the same time that the actual locking device should be so designed as to contain said recess.

It will be better if the locking device consists of two component parts which operate in conjunction with each other and which can be snapped together.

A particularly advantageous embodiment of the present invention is if the first component is in the form of an upright of circular section. This embodiment enables a peripheral groove to be formed in the upright and enables the locking device to be located in this groove. Thus the locking device will be able to rotate in the groove relative to the upright.

The fact that the locking device incorporates said recess enables the clip to be introduced and to come into contact with the end face of the upright in the groove, the locking device being designed with a peripheral groove enabling it to be rotated into a position which will lock the clip.

In order that the peripheral groove in the upright may be designed in a simple manner, it is suggested that the upright should have a profile formed from two concentric cylinders joined to each other by supporting walls and that these supporting walls should incorporate holes designed for use with pegs, screws and similar. It is suggested therefore that the peripheral groove should be formed only in the outer cylinder and supporting walls.

Advantages

The principal advantages of the present invention are to be found in the fact that a simple clip may be attached in a simple yet detachable manner to the upright and then locked in position. A number of clips may be attached to the upright using a single locking device.

The locking device for the clip suggested here has also revealed that it is possible to design the locking device in such a way that it may easily be used in conjunction with an arbitrary number of component parts of different shapes, shown in the example of an embodiment as a handrail, a direction sign and a screen.

DESCRIPTION OF THE DRAWINGS

An example of an embodiment which incorporates and demonstrates the significant characteristics of the present invention is described in greater detail with reference to the attached drawing in which FIG. 1 is a perspective view of a device enabling a second component, in the form of a handrail, a direction sign or a screen to be attached to a first component, in the form of an upright, in a secure yet detachable manner;

FIG. 2 is an exploded view of the upper part of the upright in accordance with FIG. 1, from which may be seen details of the design of the locking device and the manner in which it is fixed to the upright;

FIG. 3 is a view of the locking device consisting of two component parts in two different projections, where;

FIG. 3a is a view of the upper part of the locking device with the two components separated from each other;

FIG. 3b is a view of the upper part of the locking device with the two components joined together;

FIG. 3c is a view of the lower part of the locking device with the two components separated from each other;

FIG. 3d is a view of the lower part of the locking device with the two components joined together;

FIG. 4 is a sectional view through the upper part of the upright and a section through the locking device;

FIG. 5 is a view of a possible means of attaching to the upper part of the upright an extension, the free end of which supports a screen;

FIG. 6 is a view illustrating the manner in which the direction sign is held in a special profile track;

FIG. 7 are views of different stages in the development of a means of using a certain profile in order to produce a soundproof screen, where;

FIG. 7a is a section through a profile track and, at a certain distance from it, a screen;

FIG. 7b is a view of the lateral surfaces of the screen after having been compressed;

FIG. 7c is a view of the profile track and the screen combined together;

FIG. 8 is a sectional view through a frame structure consisting of a number of frame components formed from a profile track enabling two frame components to be held firmly together in a corner in a simple manner;

FIG. 9 is a view of the embodiment in accordance with FIG. 8 in plan view and partly in cross section;

FIG. 10 is a sectional view through the profile of the upright in accordance with FIG. 1;

FIG. 11 is a sectional view through a profile track which may be used to produce a direction sign.

DESCRIPTION OF THE PREFERRED EMBODIMENT

FIG. 1 presents a perspective view of a device enabling a second component to be attached in a secure but simply detachable manner to a first component in the form of an upright 1. This second component is illustrated in FIG. 1 in the form of a handrail under reference 2, in the form of a direction sign under reference 3, in the form of a screen under reference 4 and in the form of a tape magazine under reference 5.

It should be noted at this point that the direction sign 3 and the screen 4 appear in a remote position in which they are not working in conjunction with the upright. FIG. 1 also shows that a tape magazine has been attached to the upright. It is assumed that the tape 5a is rolled up inside the magazine 5b and possibly also in the magazine 5c in such a way that it may be pulled or rolled out, against the force of a spring, in the direction of the arrow P, so that the magazine 5c may be attached by means of a clip to another upright with a locking device which is not shown in the Figure.

As the clips used for all the components are identical, the following description which applies to any one of the clips specifically applies to the clip for the sign 3 and to a certain extent to the screen 4. This clip has been allocated the reference 6 and consists of a part 6a which extends at right angles from the sign 3, known as the horizontal part, together with a part 6b which lies at right angles to it, known as the vertical or outer part. The upright 1 has a recess 7 large enough to accept the outer part 6b of the clip. This may be seen most clearly in FIG. 1 from the manner in which the part 6b is attached to the direction sign 3. The upright 1 operates in conjunction with a locking device so designed that in one position, as shown in FIG. 1, it will accept the outer part 6b of the clip, but that in a second position, obtained by rotating the locking device 8 to a position half way between the handrail 2 and the direction sign 3, it will enable the clip 6 to be locked in that position.

The locking device 8 is thus arranged so as to rotate in relation to the upright 1 and the actual locking device incorporates said recess 7. According to FIG. 2 the locking device 8 consists of two component parts (8a, 8b) which operate in conjunction with each other.

According to the example of the embodiment the first component 1 consists of an upright of circular section (see FIG. 10). This upright incorporates a peripheral groove 1a and the locking device 8 is located in this groove. The locking device contains the recess 7 by means of which the clip 6 and any number of similar clips may be introduced so that it comes into contact with the end face 1a' of the upright in the groove 1a. The locking device 8 is also designed with a peripheral groove 8c which enables the locking device 8 to be rotated into a position in which the clip 6 is locked. In addition to the groove 8c the locking device also has a collar 8d designed to come into contact with the supporting wall 1b in conjunction with the inner part 1d.

FIG. 10 shows a cross section of the upright 1. This is cylindrical in shape and the upright consists of two concentric cylinders 1c and 1d joined together by means of four supporting walls 1b. These supporting walls 1b have holes 1e designed to be used with pegs, screws and similar for the purpose of attaching unit lengths to each other to form a long upright.

FIG. 2 illustrates particularly well that the recess 1a is only designed to extend through the outer cylinder 1c and the walls 1b, with the inner cylinder 1d remaining intact.

The upper surface of the upright 1 is combined with a cover 9 which incorporates a pin 9a intended to work in conjunction with the inner surface of the tube 1d.

FIG. 3 reveals that the component 8a and the component 8b may be made as two separate parts and then brought together in order to form a single unit by bringing the hook 8a' in the component 8a together with the corresponding recesses in the part 8b. FIG. 3b shows the locking device in its assembled form.

FIGS. 3c and 3d show the locking device in projections other than those shown in FIGS. 3a and 3b.

FIG. 4 is a section through the locking device indicating the manner in which the vertical part 6b of the clip may be introduced into the recess 7 in such a way that the horizontal part 6a of the clip may drop down and rest on the end face 1a' of the upright 1. By subsequently rotating the locking device 8 the surface 8c will move to a position above the horizontal part 6a and will lock it in the position in which it has been placed. This is shown on the right in FIG. 4.

FIG. 5 shows the manner in which the central recess of the upright, the inner surface of the cylinder 1d, may be used to secure a tube or an extension rod 10. This tube 10 passes through a central hole in a specially designed cover 11, the surface of which is also provided with a locking screw 12 for the tube 10. The upper part of the tube 10 can support any desired component, although a direction sign has been shown in FIG. 5. The upper part 10a of the tube thus operates in conjunction with a securing arrangement for the sign 13, which has been illustrated in the form of a track 14 and a screw 15. The tube 10 extends through holes (borings) in the profile components 16a and 16b.

FIG. 6 contains a sectional view of the track profile for the track 16 which is to be used to produce the direction sign 13. The direction sign consists of two sheets 13a with covers or signs 13b applied to the outside.

FIG. 7 illustrates the manner in which the profile 16 may also be used to produce a soundproof screen. This screen consists of a soundproofing material 17 and two walls 18 and 19. These may be compressed as shown in FIG. 7b so that the distance between the walls 18 and 19 becomes less than the distance between the walls 16c and 16d of the profile 16. Thus by pushing the profile 16 over the flanged parts 18a and 19a of the walls and then by removing the compressive force the walls 18 and 19 will expand, as shown in FIG. 7c, and will operate in conjunction with the hooks 16c' and 16d' of the track 16.

FIGS. 8 and 9 show a frame structure consisting of a number of frame components and produced from a special profile. The corners of the frame components are fitted with a clamping device 20 in the form of an angle. This clamping device now works in conjunction with the frame components 21 and 22.

The clamping device 20 incorporates a number of holes 20a which may be fitted with a screw. The clamping device 20 itself is inserted into one of two channels in the profile. The first channel has been given the reference 23 and the second channel has been given the reference 24. The first channel is designed and shaped to have an outward facing slot 25, said slot also representing the slot in the second channel 24. The head 26a of the screw 26 is intended to be positioned in the second channel 24 and thus to secure the clamping device 20 in the direction of the slot 25. The surface of the second channel 24 which faces away from the slot 25 has an additional slot 27 for the purpose of providing direct access to the screw 26.

The end surfaces of the frame components 21 and 22 are mitred in such a way that the first channel 23 in one of the frame components 21 is placed opposite the first channel 23a of the adjoining frame component 22. The second channel 24 in one of the frame components 21 is placed opposite the second channel 24a of the adjoining frame component 22. The clamping device 20 may thus be inserted into the first channel 23 or 23a, whilst the screws 26 fixed to the clamping device shall be so positioned in the clamping device that the screw heads 26a run in the second channel 24 or 24a. Thus by rotating the screws the clamping device 20 will be gripped tightly against the second channel 24 or 24a.

Finally, FIG. 11 shows the profile which is to be used to produce a sign 3. This profile incorporates a part 30 designed to operate in conjunction with a sign, as well as a channel 31 with an outward-facing opening in the form of a slot 32. The inside of the channel 31 provides space for securing the clip 6 of the type shown in conjunction with FIG. 1.

The upper part 33 and the lower part 34 are semi-circular in shape and are separated from each other by the walls 35 and 36. The groove 37 is designed to fix the location of end caps.

In the case of the device in accordance with FIG. 7, what is shown there is a screening arrangement consisting of a frame divided up into a number of frame components, preferably in the form of four such components set at right angles to each other, with a screen fixed between the frame components. The screen has two stiff walls in the form of sheets of wood, cardboard or similar material, with the cavity between them being filled with a compressible material 17 in the form of a soundproofing and/or thermally insulating material. The walls 18, 19 shall be capable of being moved towards each other, thereby compressing the material 17. The force imposed on the walls 18, 19 by the compression shall be absorbed by projections formed in the profile used for the frame.

Thus a screening arrangement of this kind is manufactured by compressing the walls and attaching the frame components, preferably using a device in accordance with FIG. 8 and FIG. 9 in the corners.

As far as concerns the choice of material for the components shown in the typical embodiment, then suitable profile components could be produced from extruded aluminium or a similar material. Plastic could also be used. The end fittings and the locking device may be manufactured in plastic material. The clamping device may be manufactured in aluminium.

The invention is not of course restricted to the embodiment shown above as an example, but may be modified within the context of the following Patent Claim.

I claim:

1. A device for attaching a first component to a second component in a secure but detachable manner, the device comprising a clip arranged on the second component, the clip being in the form of an angle, a recess operatively associated with the first component, said recess being large enough to accept the clip, the first component working in conjunction with a locking device movable between first and second positions, said locking device in the first position accepting the clip in the recess for engagement with the first component, and the locking device in the second position locking the clip to the first component.

2. The device in accordance with claim 1, wherein the locking device is arranged to rotate in relation to the first component between the first and second positions, and said locking device containing said recess.

3. The device in accordance with claim 1, wherein the locking device consists of two component parts which operate in conjunction with each other.

4. The device in accordance with claim 1, wherein the first component consists of an upright of circular cross-section, characterized, the upright includes a peripheral groove, the locking device being inserted into said groove and containing said recess into which the clip may be introduced so that the clip contacts a portion of an end face of the upright defining the groove, and the locking device having a peripheral groove for enabling rotation of the locking device into the second position to lock the clip.

5. The device in accordance with claim 1, wherein the first component consists of an upright of circular cross-section, the upright having two concentric cylinders joined together by supporting walls, said walls having holes adapted for use with pegs, screws and similar elements.

* * * * *